United States Patent Office 3,624,878
Patented Dec. 7, 1971

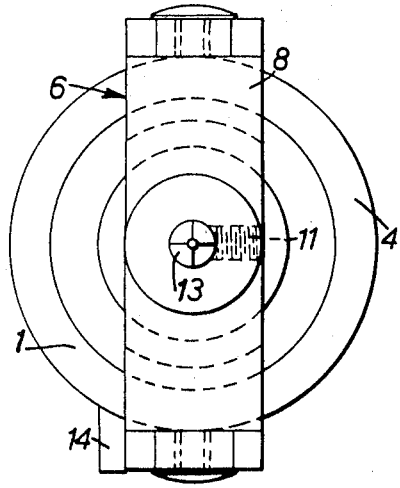
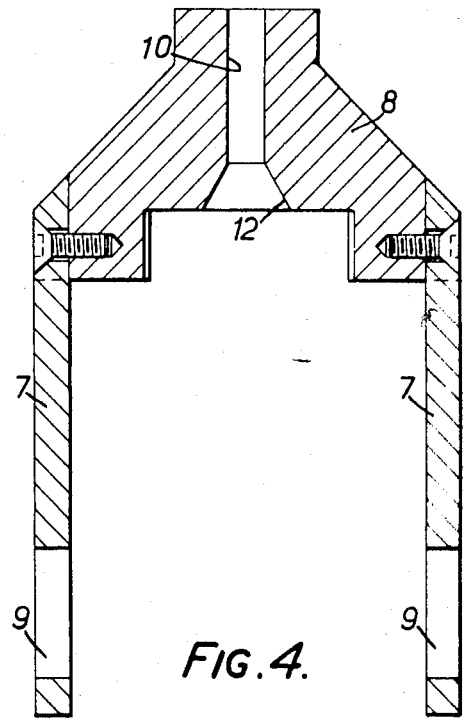
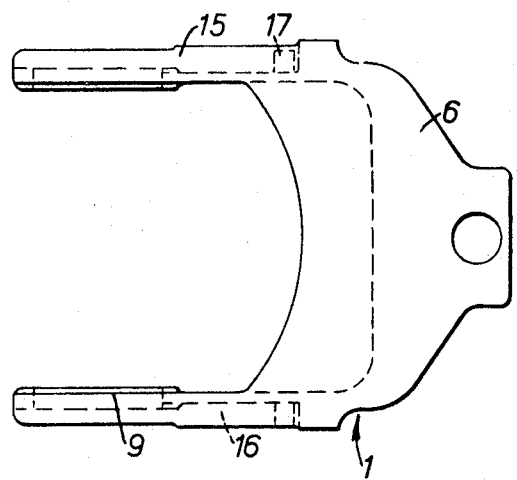

3,624,878
TOOLS FOR LATHES
Leonard Victor Barnett, Guilford, and George Nathan Drinkwater, Little Brookham, England, assignors to G. H. Drinkwater & Sons Limited
Filed Oct. 6, 1969, Ser. No. 864,045
Claims priority, application Great Britain, Oct. 9, 1968, 47,774/68
Int. Cl. B23b 29/00, 43/02
U.S. Cl. 29—96                4 Claims

ABSTRACT OF THE DISCLOSURE

A tool carrier for mounting and centering a tool on a centre receivable by a tail stock or turret comprising a body portion and parallel arms extending therefrom, the body portion including a conical recess in which a conical portion on the centre bears when the tool carrier is centred on the centre and a tool socket coaxial with the recess, the carrier being pivotal on and axially movable relative to the centre by pins extending through longitudinally extending apertures adjacent the ends of the arms of the carrier into the centre or a ring removably fixed round the centre, whereby the carrier can be moved from an operative position when it is centred on the centre to an inoperative position.

---

This invention is concerned with improvements in and relating to tool carriers for mounting a tool on a centre receivable by a tail stock or turret and it is an object of the invention to provide an improved carrier for mounting on a centre.

It is known to provide a demountable tool carrier comprising a body portion attached to an arcuate mounting member which in cross-section has the form of a major arc of a circle. The body portion is provided with a tool socket and a conical recess in which a conical centering projection on a cylindrical centre is engaged when the mounting member is positioned coaxial with and partly surrounding the centre, the mounting member being fixed to the centre by set screws threaded in the mounting member and frictionally engaging the centre. When required the carrier is manually positioned on the centre and is itself centred on the centre by the operator in screwing it down. A work piece may be drilled by a drill in the centred carrier and thereafter the tool carrier is completely removed from the centre by slackening the screws before the centering projection on the centre can be moved into the drilled hole. There is thus considerable expenditure of time on the part of the operator in positioning and removing the tool carrier.

It is thus an object of the invention to provide an improved tool carrier which does not require demounting between use of the tool it carries and the centre on which it is mountable.

The invention thus consists in a tool carrier in or for use in a centering device receivable by a tail stock or turret and comprising a centre, the tool carrier having a socket for a tool and being mountable on the centre for pivotal movement between a retracted position and an operative position in which a tool socket is centred on and supported by the centre.

Embodiments of the present invention will now be described, by way of example only, with reference to the accompanying drawings of which:

FIG. 3 is an end elevation of the centering device with the tool carrier in the operative position;

FIG. 4 is a section of the tool carrier on the line IV—IV of FIG. 2;

FIG. 5 is a plan view of a modified form of tool carrier;

Figures 1, 2:
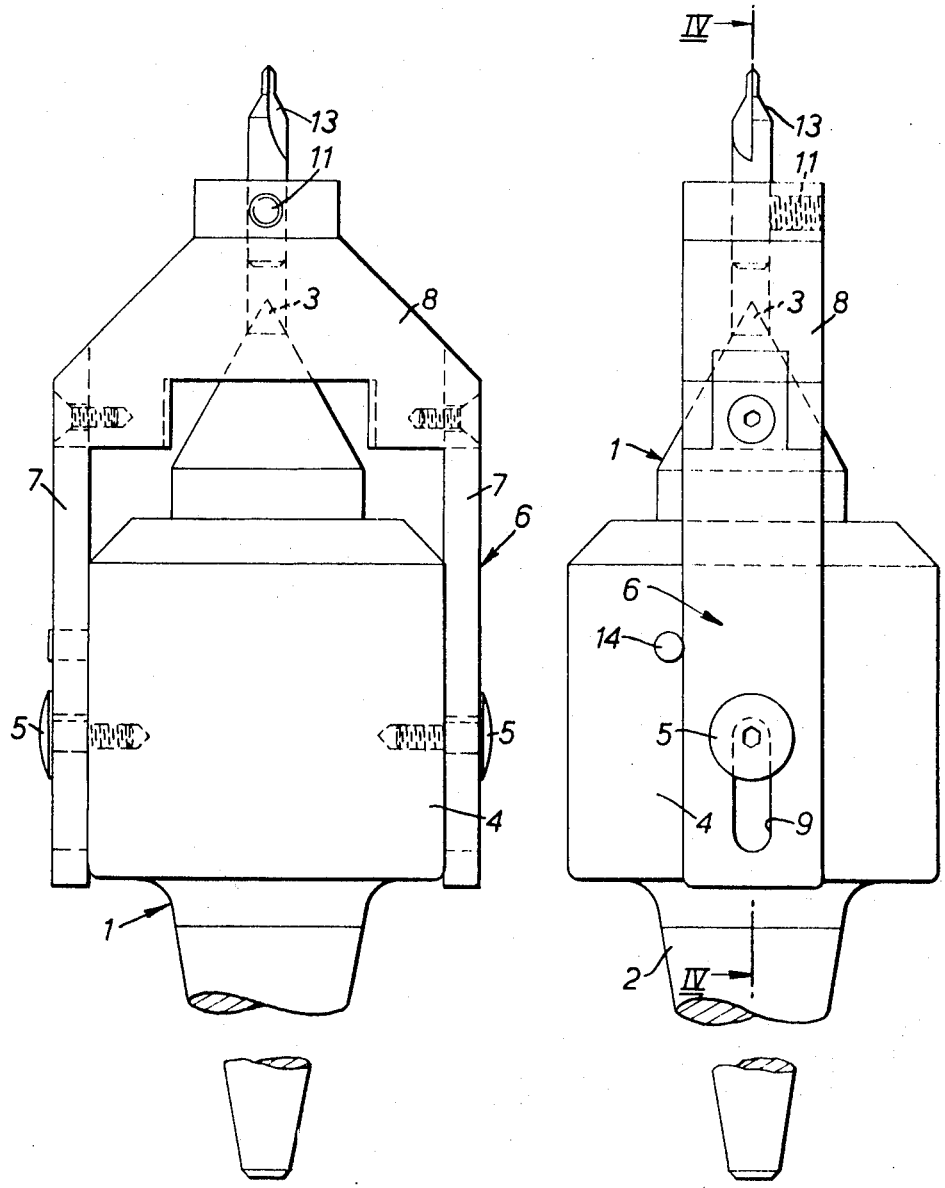
FIG. 1 is a plan view of the centering device with the tool carrier in the operative position.
FIG. 2 is a side elevation of the centering device with the tool carrier in the operative position.
Figure 6:
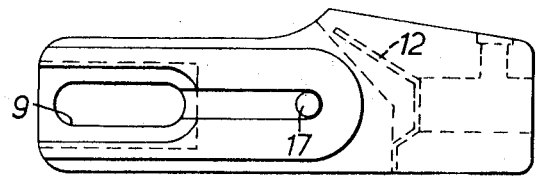
FIG. 6 is a side elevation of the modified form of tool carrier.

The centering device shown in FIGS. 1–3 is a live centre 1 of known construction having a mounting stock 2 for engagement in a tail stock or turret. The centre has a conical nose 3.

Pivotally mounted on the body 4 of the live centre 1, by bolts 5, is a tool carrier 6, see also FIG. 4, having a pair of mounting arms 7 bolted to a head 8.

The mounting arms have elongate apertures 9 which receive the bolts 5 so that the tool carrier is not only pivoted on the body 4 but also axially movable on the body.

The head 8 has a bore 10, grub screw 11 and a conical seat 12 into which the bore opens.

As illustrated the tool carrier is in the operative position in which the conical seat 12 engages live centre nose 3 and the bore 10, with a drill 13 locked therein by screw 11, is coaxial with the centre. The tool carrier is located in the operative position to drill a recess in the end of a spindle blank for example. When the recess has been drilled, the tail stock is moved back, the tool carrier moved forward to clear the conical seat from the nose, the carrier is swung away to an inoperative position clear of the nose and the stock is run up to engage the nose in the recess. A stop 14 is provided to prevent the carrier dropping past the nose when putting the carrier in the operative position.

In the modification of the tool carrier shown in FIGS. 5–8, the carrier body 6 has integral arms 15 each including an elongate recess 16 surrounding the slot 9 and extending beyond it. The carrier is mounted on the centre as in the previous embodiment by two bolts each of which, in this embodiment, receives a collar 19 coupled to a spring 20 anchored on a stud 17 in the recess 16. When the carrier is centred on the centre the spring is tensioned to hold the carrier in position. To remove the carrier from its operative position, it is drawn axially from the centre against the spring and then swung about the bolts 5. The surface 21 acts as a stop abutting the centre.

Figure 7:
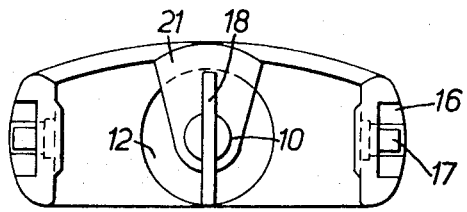
FIG. 7 is an end elevation of the modified form of tool carrier.
Figure 8:
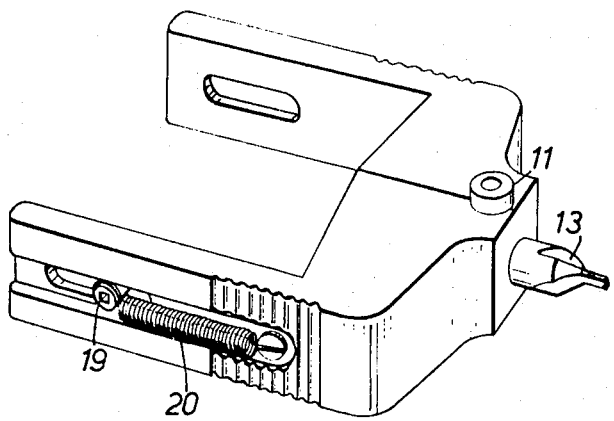
FIG. 8 is a perspective view of the modified form of tool carrier with a tool fitted.

The inner face of the carrier body, provided with the conical recess 12, is additionally provided with a slot 18, FIG. 7, to prevent scoring of the face by the centre.

The two forms of carrier described may be provided in combination with a centre or may be fitted to existing centering heads. Thus the carrier may comprise a member preferably a ring dimensioned to fit closely on to a head and having grub screws to screw it on the head, the arms of the carrier being pivotable and axially movable relative to the ring as previously described.

We claim:

1. A tool carrier for use with a lathe centering device comprising a centre, said tool carrier comprising a body portion, a pair of arms extending from the body portion to receive the centering device between them, a tool socket in the body portion disposed to be in axial alignment with the centering device when the carrier is mounted thereon in the operative position, longitudinally extending slots in each arm of the carrier, a mounting pin passing through each slot for securing the carrier to the centering device, and locating means on the carrier engageable with the centering device to centre the carrier in the operative position with respect to the centering device, the said slots in said arms permitting axial movement of the carrier, when the mounting pins are loosened to free the body from the centering device to enable the carrier to swing about said pins to an inoperative position clear of the operative portion of the centering device.

2. A tool carrier as claimed in claim 1 in which said locating means includes a conical recess and the centre includes a conical portion which bears in the said recess when the tool carrier is in its operative position on the centre.

3. A tool carrier as claimed in claim 1 further comprising a pair of springs attached one to each arm by a respective end, the other end of each spring being connectable to that pin extending through the aperture in the respective arm whereby to bias the carrier towards the centre when the carrier is in its operative position.

4. A tool carrier as claimed in claim 2 in which the carrier is pivotally mounted adjacent the ends of the arms remote from the body portion on an annular member having means for fixing said member on a centre.

References Cited

UNITED STATES PATENTS 2,481,939  9/1949  Miller _____ 77—18

FOREIGN PATENTS 978,887  11/1950  France _____ 77—60

FRANCIS S. HUSAR, Primary Examiner